United States Patent [19]

Zeroni et al.

[11] Patent Number: 5,108,666
[45] Date of Patent: Apr. 28, 1992

[54] PROCESS FOR THE PRODUCTION OF A RECORDING MATERIAL

[75] Inventors: Ludwig Zeroni, Ottobrunn; Gustav Klose, Munich, both of Fed. Rep. of Germany

[73] Assignee: BASF Magnetics GmbH, Mannheim, Fed. Rep. of Germany

[21] Appl. No.: 348,274

[22] Filed: May 5, 1989

[30] Foreign Application Priority Data

May 21, 1988 [DE] Fed. Rep. of Germany ....... 3817446

[51] Int. Cl.⁵ ............................ D01D 5/12; B29C 59/00
[52] U.S. Cl. ............................... 264/22; 264/129; 264/171; 264/210.1; 428/1
[58] Field of Search ..................... 428/1, 480; 264/22, 264/129, 171, 210.1

[56] References Cited

U.S. PATENT DOCUMENTS

| | | | |
|---|---|---|---|
| 4,719,171 | 1/1988 | Ikenaga et al. | 430/271 |
| 4,726,998 | 2/1988 | Ikenaga et al. | 428/900 |
| 4,798,759 | 1/1989 | Dallman et al. | 428/480 |
| 4,833,019 | 5/1989 | Suwarnasarn | 428/480 |

*Primary Examiner*—Alexander S. Thomas
*Attorney, Agent, or Firm*—Connolly and Hutz

[57] ABSTRACT

A process for the production of a recording material consisting of a layer support and one or more recording layers cast thereon, for example a magnetic layer or photographic layers, is characterized in that the flexible layer support in the form of a tape contains at least one liquid crystalline polymer. The recording material thus produced is distinguished by excellent properties and in addition affords the advantage that after production of the layer support, the recording layers can be applied on line at a high casting velocity by means of known casting processes.

6 Claims, 2 Drawing Sheets

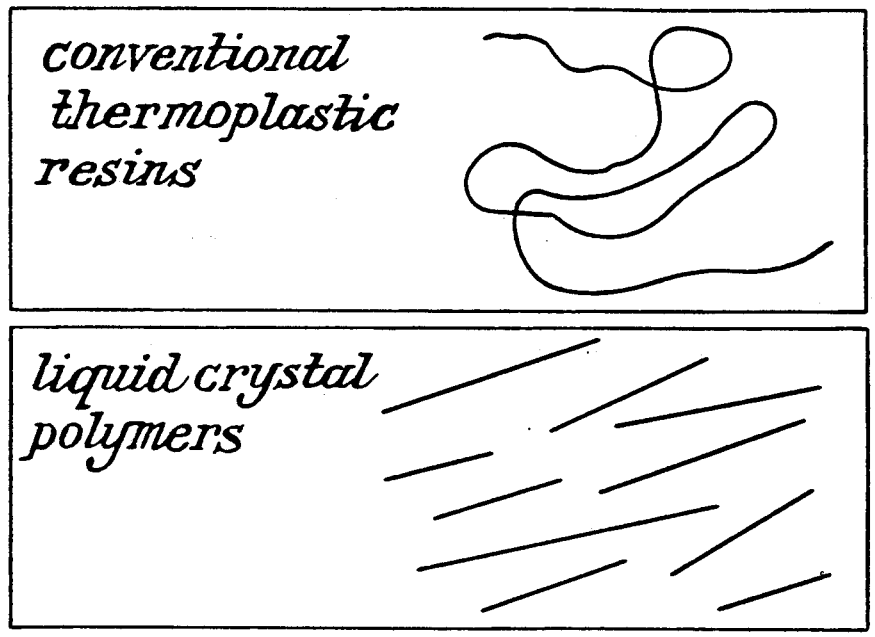
Fig. 2a.
Fig. 2b.
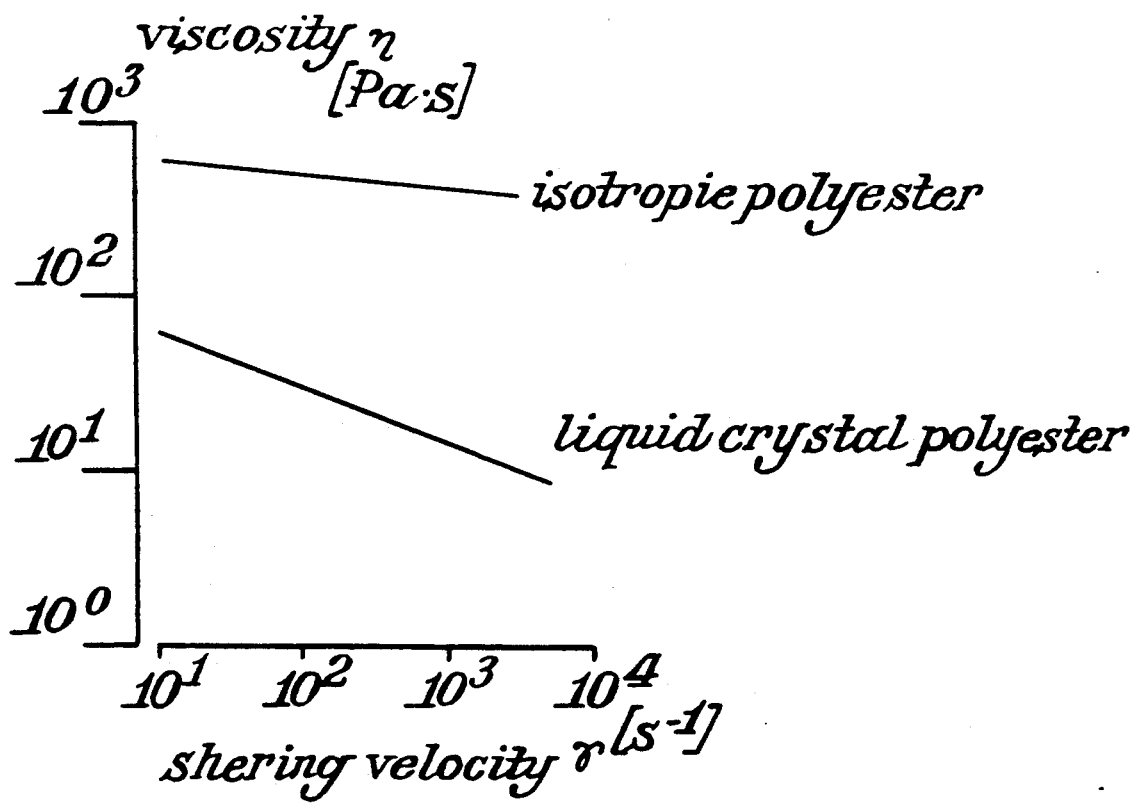
Fig. 3.

PROCESS FOR THE PRODUCTION OF A RECORDING MATERIAL

BACKGROUND OF THE INVENTION

This invention relates to a process for the production of a recording material consisting of a flexible layer support in the form of a tape and one or more photographic or magnetic layers cast on this tape and optionally one or more layers cast on the other side of the layer support.

Polyethylene terephthalate (polyester) is the material nowadays preferably used for the layer support for the production of recording materials of the type mentioned above, such as photographic films or magnetic tapes. The thickness of the layer support depends on the purpose for which it is used and is generally about 3 to 500 μm. Numerous processes for the production of such layer supports are known, for example from GB Applications 99 54 38, 95 42 04 and 87 00 95, WO Application 85 00 1247, DE-OS 1 097 704, 2 219 363, 3 201 153 and 3 333 703 and EP O 099 839 and 0 160 889.

It is clear from the above-mentioned specifications that to produce polyester layer supports having the required mechanical properties, the supports must be stretched both transversely and in the longitudinal direction under specified thermal conditions. This necessitates an enormously complicated and expensive manufacturing process.

Further disadvantages of such layer supports are:
- The difficulty of avoiding inhomogeneity due among other things to the high viscosity of the polyester melt in the casting process, especially when thin films are to be produced,
- three-dimensional film profiles, especially variations in thickness due to the complicated method of production,
- severe wear on the cutting tools used for cutting the recording materials to the width required for use, and
- high manufacturing costs since the layer support must be wound and tested after its production before casting can be continued.

The problem therefore arose of finding a process for the production of a recording carrier of the type mentioned above which would not have the aforesaid disadvantages and which in particular would enable the required coatings to be applied with known casting apparatus on line immediately after the production of the layer support.

According to the invention, this problem was solved by a process having the features mentioned in the characterising part of claim 1. Further details of the invention will be apparent from the sub-claims, the description and the drawings.

BRIEF DESCRIPTION OF THE DRAWINGS

The invention will now be described in more detail with reference to the drawings, in which FIG. 3 is a graph comparing the flow properties of polymers used in the prior art layer supports and polymers used in the process according to the invention.

DESCRIPTION OF THE PREFERRED EMBODIMENTS

Figure 1:
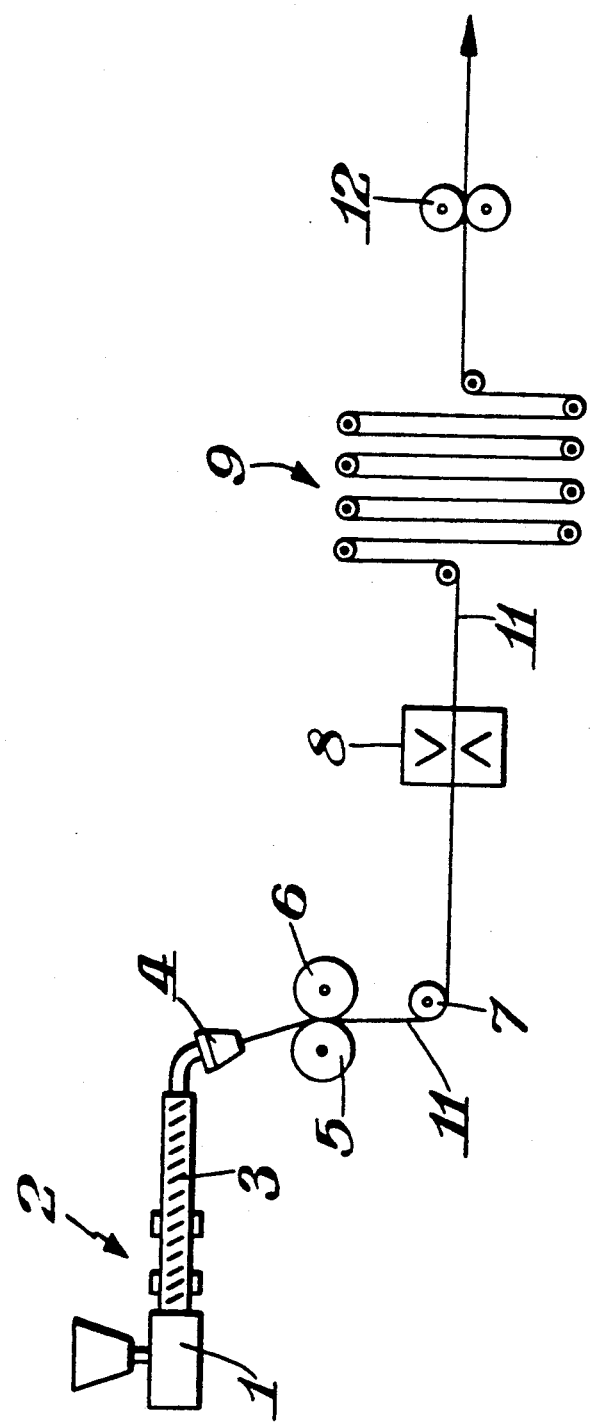
FIG. 1 is a schematic representation of the arrangement for carrying out the process according to the invention, FIG. 2a/b shows the orientation of the prior art polymers used for the layer support and of the polymer according to the invention.

It is essential to this invention, as will be explained in more detail below, that
- the layer support for the production of the recording material should consist substantially of one or more thermotropic polymers, preferably a liquid crystal polyester,
- the liquefied thermotropic polymer should preferably be cast from a slot die of an extrusion caster to give an elongated conformation of the liquid crystal polymers in the direction of casting (FIG. 2b) whereas conventional thermoplasts give rise to a tangled string of polymer (FIG. 2a),
- in a preferred embodiment, the recording layer or layers are applied on line to the extruded and solidified layer support, optionally also to the back of the support, by known casting processes,
- the desired properties of the layer support, such as its thickness, tensile strength, elongation on heating and elastic modulus can be adjusted or obtained by suitable choice of the extrusion conditions (extrusion temperature, shearing gradient, width of the outflow gap, outlet velocity and traction velocity of the cooling roller and of the driving roller pressed against it), and
- no stretching process is required for the production of the layer support.

For the process according to the invention, it is suitable to use thermotropic polymers, especially polycondensates, as material for the layer support. Thermotropic polycondensates (also known as mesomorphic polycondensates) are polycondensates which form liquid crystalline melts. The liquid crystalline state of the polycondensation melts may be investigated with a polarization microscope. For investigations carried out with this microscope, the eyepiece was fitted with an attachment containing a photoelectric diode arranged at the focal point of the eyepiece. A measuring amplifier with control device connected in series with the aforesaid attachment was used to adjust the measured value obtained in the absence of a sample of material to 100 scale divisions when the microscope was switched on with the Nicol prisms arranged in parallel. The value obtained with crossed Nicol prisms was then 0.01 scale divisions.

The layer thickness of the polycondensate melts investigated was 100 μm. Investigation of the liquid crystalline melts was carried out after the samples had been melted at temperatures from 250° C. to 400° C. If a liquid crystalline melt was observed over all or part of this range, the polycondensate was regarded as thermotropic.

In order to ensure that the optical anisotropy of the melt was due to a liquid crystalline state and not to crystals of polycondensate floating in the melt, the melt was heated to a further 30 degrees Centigrade above the previous investigation temperature after the measurement had been carried out. Under these conditions, crystals melt so that the optical anisotropy of the melt disappears. It is only when brightening of the melt observed between Nicol prisms persisted in spite of further heating that the polycondensates were graded as thermotropic. They showed values above 1 scale division in the measuring arrangement, in most cases values from 3 to 90 scale divisions. For amorphous melts, e.g. aromatic polycarbonates, values of less than 0.1 scale divisions were found.

The method described above is particularly suitable as a rapid laboratory determination and gives unequivocal results in almost all cases. In cases of doubt, it may be advisable to prove the presence of liquid crystalline components in the melt by X-ray wide angle scattering as described, for example, by G. W. Gray and P. A. Windsor in "Plastic Crystals, Physico-Chemical Properties and Methods of Investigation", in particular Chapter 3, John Wiley and Sons, New York, Sydney, Toronto 1974.

The most suitable liquid crystaline polycondensates for the process according to the invention are thermotropic polyesters. These have been described in numerous applications, for example in DE-OS 3 325 705, 3 325 787, 3 338 805, 3 415 530, 3 542 778, 3 542 813, 3 542 814, 3 542 815, 3 629 208, 3 629 209, 3 629 210 and 3 629 211 and EP 131 846, 133 024 and 134 959. Polythioesters, polyesterimides, disclosed, for example, in DE 3 516 427, polyamides, polyamidimides as described in DE 3 542 796, copolyesters disclosed in EP 0 083 426 and copolyesters containing cholesterol groups as described, for example, in EP 0 218 369 and 0 251 688 are also suitable. Other suitable polycondensates are disclosed in EP 230 550. 249 662 and 261 976, to mention only a few examples of the polymers suitable for the process according to the invention.

The above-mentioned polymers are distinguished by the fact, as may be seen from FIG. 3, that they have extremely advantageous flow properties at and below temperatures of 300° C., compared with conventional polyesters, the viscosity depending on the shearing gradients and being lower by about a power of 10 than in conventional polyesters, so that extremely advantageous flow properties for extrusion of the melt are obtainable.

FIG. 1 illustrates an embodiment of an apparatus suitable for carrying out the process according to the invention. The liquid crystalline polycondensate, which is delivered in the form of a granulate, is melted in a melting apparatus 1 which may, for example, be heated electrically, and the polycondensate is then passed through an extruder 2 with screw conveyor 3 to a broad sheeting die 4 at a processing temperature of about 300° C. and the melt is discharged in a downward direction from this die at a speed of $v_0$.

After about 40–60 cm, the melt flows over a cooled draw-off cooling roller 5 which solidifies the melt and which is in contact with a pressure roller 6. The rollers rotate at a circumferential speed of $v_1$. The layer thickness of the carrier film 11 is regulated by the width of the die and by the ratio of draw-off speed to delivery speed $v_1/v_0$.

After passing over a deflecting roller 7, the layer support travels through a thickness measuring device 8 which adjusts the rate of delivery on line to ensure that the layer thickness of the support will be constant at a constant draw-off rate. After its passage over a compensator 9 which keeps the tension on the layer support 11 constant, the support passes through a two-sided casting drive 12 into a casting apparatus (not shown) which applies the recording layer or layers.

There is no limitation either to the nature of the casting apparatus used nor to the recording layer. For example, extrusion casters, immersion casters, suction casters, cascade and curtain casters and stripping casters may be used for coating the recording layer. The recording material itself may consist, for example, of a magnetic or photographic material, for example a magnetic tape suitable for audio or video or data recording and the photographic material may be a black-and-white film or a colour film. It may carry one recording layer cast on it or, as is usual in cascade or curtain casting processes, it may have several layers, for example 3 to 12 layers cast on it simultaneously, one above the other, and one or more layers may also be applied to the back at the same time by processes known in the art.

Adhesive layers may be applied to the recording material before other layers are cast on it or the material may be subjected to a corona treatment to improve the bond with the layer cast on the support.

Any width may be chosen for the layer support used in the process according to the invention, for example 60 cm for magnetic tape and about 110 cm for photographic materials but smaller or greater widths may be employed. The rate of transport through the casting station and the speed of casting may be chosen as for conventional modern casting processes and is approximately in the range of from 50 to 500 m/min. The recording materials are dried in a drying channel in the usual manner and are then optionally made smooth between heated rollers and compressed. The recording materials may subsequently be cut up on line in conventional cutting machines to reduce them to the width required for use, e.g. 35 mm, 3.81 mm or 6.24 mm and they may then be packaged for use, in cassettes if they are to be used as magnetic tape or in spools in the case of photographic film.

From what has been said above it is clear that production of a layer support, application of recording layers and packaging of the recording carrier in a form suitable for use can be carried out extremely rationally in a single operation by the process according to the invention so that an end product of excellent quality can be produced very simply without any costs for intermediate storage and testing.

The invention will now be described in more detail with the aid of Examples, which serve only to illustrate the invention without limiting it.

EXAMPLE 1

A thermotropic polyester granulate according to DE-OS 3 325 787, Example 3, was melted at 280° C. The viscosity was 600 Pa.s at a shearing velocity of $10^3/s^-$. The melt was extruded through a broad sheeting die at a casting width of 650 mm and a width of slot of 80 μm and an outlet velocity of 40 m/min and passed over a takeoff cooling roller 600 mm in diameter which imparted a velocity of about 400 m/min to the solidified film. The thickness of the layer support obtained was 8 μm. After the layer support had passed through a compensator 20 m in length, a magnetic dispersion having the following composition was cast on the layer support from an extrusion caster having a casting width of 635 mm: 737 parts of needle-shaped $CrO_2$ having a coercivity of 39.8 kA/m, 25 parts of vinylidene chloride/acrylonitrile copolymer, 23 parts of lecithin, 580 parts of tetrahydrofuran and 209 parts of cyclohexanone, 106 parts of polyester urethane, 534 parts of tetrahydrofuran, 4 parts of fatty acid, 9 parts of butyl stearate, 15 parts of a 75% solution of a cross-linking agent (Desmodur L of Bayer AG) and 0.2 parts of iron acetylacetonate.

The dispersion was orientated in the direction of casting in a magnetic field, dried and calendered at a linear pressure of 80 kp/cm. The thickness of the layer when dry was 3 μm.

The magnetic recording material thus obtained was then cut into strips 6.24 mm (¼" in width) and packaged in a VHS video cassette.

The magnetic recording material obtained as described above had excellent electroacoustic and mechanical properties, for example the skew fault was substantially lower than in a video tape which had been cast on a conventional polyester layer support of the same thickness and the winding and slip properties of the video tape produced by the process according to the invention were greatly improved compared with the state of the art.

EXAMPLE 2

A thermotropic PE granulate according to DE-OS 3 415 530, Example 5, was melted at 295° C. and extruded across a width of 140 cm through a broad sheeting die having a width of slot of 0.5 mm. The molten granulate solidified on a cooling roller and with a layer thickness of 170 μm it was passed at a speed of 150 m/min over a compensator according to Example 1 into a corona treatment station as described e.g. in DE 3 631 584 and pretreated on both sides to improve the adherence of the recording carrier. The following photographic X-ray film compositions were then cast on both sides over a casting width of 135 cm from a sheeting die:100 Parts of silver iodobromide emulsion having an average grain size of 2.5 μm and a covering power of 60, 200 parts of gelatine, 10 parts of saponin as wetting agent and 5 parts of mucochloric acid as hardener. The amount of silver applied was 3.7 g of Ag on both sides.

The resulting recording layer was passed through a floating jet drier and cut up into the format required for use. The photographic and mechanical properties and dimensional stability and uniformity of casting were excellent.

EXAMPLE 3

A polyester granulate capable of thermotropic crosslinking according to EP 0 249 662, Example 3, was melted at 256° C. and extruded in a width of 114 cm through a broad sheeting die having a width of slot of 300 μm and transferred to a set of cooling rollers which imparted a speed of 200 m/min to the layer support which at this stage had a thickness of 125 μm. The following photographic layers for a colour reversal film material were applied in the given sequence in two passes through a multiple cascade caster:

The quantities given refer in each case to 1 m². The quantities of silver halide applied are given in the corresponding quantities of $AgNO_3$.

Layer 1 (Antihalation layer)
 black colloidal silver sol containing 1.5 g of gelatine and 0.33 g of Ag Layer 2 (interlayer)
 0.6 g of gelatine Layer 3 (1st red-sensitized layer)
 red-sensitized silver iodobromide emulsion (3.5 mol-% iodide; average grain diameter 0.22 μm) containing 0.98 g $AgNO_3$, 0.81 g gelatine and 0.46 mmol cyan coupler corresponding to the following formula:

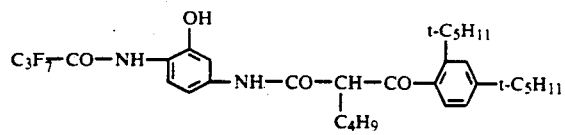

Layer 4 (2nd red sensitized layer)
 red-sensitized silver iodobromide emulsion (4.8 mol-% iodide; average grain diameter 0.6 μm) containing 0.85 g $AgNO_3$, 0.7 g gelatine and 1.04 mmol of the cyan coupler contained in layer 3

Layer 5 (interlayer)
 2 g of gelatine and 0.15 g of 2,5-ditertiaryoctylhydroquinone Layer 6 (1st green-sensitized layer)
 green-sensitized silver iodobromide emulsion (4.3 mol-% iodide; average grain diameter 0.28 μm) containing 0.85 g $AgNO_3$, 0.75 g gelatine and 0.43 mmol magenta coupler corresponding to the following formula:

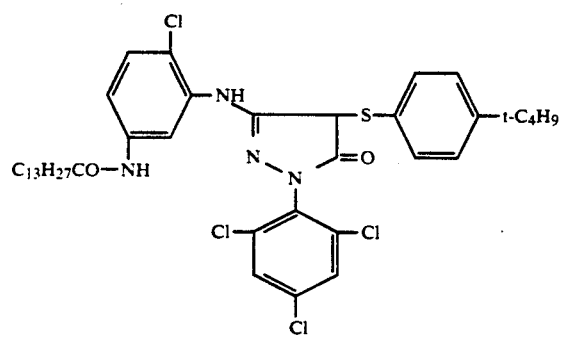

Layer 7 (2nd green-sensitized layer)
 green-sensitized silver iodobromide emulsion (3.8 mol-% iodide; average grain diameter 0.62 μm) containing 1.03 g $AgNO_3$, 0.89 g gelatine and 0.91 mmol of the magenta coupler contained in Layer 6

Layer 8 (interlayer)
 1.2 g of gelatine and 0.12 g of 2,5-ditertiary-octylhydroquinone Layer 9 (yellow filter layer)
 yellow colloidal silver sol containing 0.2 g Ag and 0.9 g gelatine Layer 10 (1st blue-sensitized layer)
 blue-sensitized silver iodobromide emulsion (4.9 mol-% iodide; average grain diameter 0.36 μm) containing 0.76 g $AgNO_3$, 0.56 g gelatine and 0.53 mmol yellow coupler corresponding to the following formula:

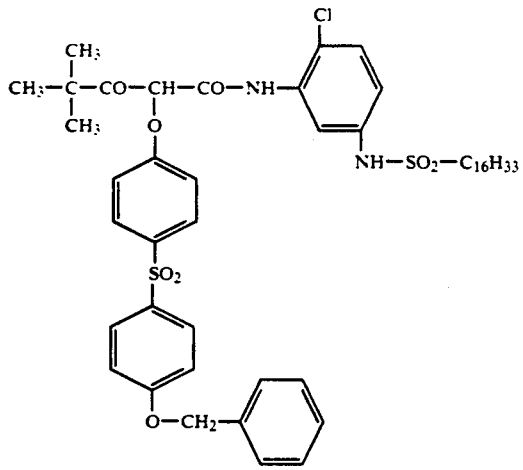

Layer 11 (2nd blue-sensitized layer)

blue-sensitized silver iodobromide emulsion (3.3 mol-% iodide; average grain diameter 0.78 μm) containing 1.30 g $AgNO_3$, 0.76 g gelatine and 1.62 mmol of the yellow coupler contained in Layer 10

Layer 12 (protective layer)

1.2 g of gelatine

Layer 13 (hardening layer)

· 1.5 g of gelatine and 0.7 g of hardener corresponding to the following formula:

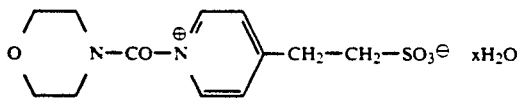

The photographic recording material prepared as described above was cut into strips of 35 mm widths and as well made up into a sheet film. Excellent mechanical and photographic properties were obtained in every case.

Summarizing, the process according to the invention affords the following advantages compared with what has previously been known.

Strength, E-modulus and toughness of the recording carrier produced are about 3 times greater and the elongation on heating is only about 10% of that of a material which has been cast on a conventional polyester layer support.

The homogeneity and cleanliness of the layer support are substantially improved and the abrasion resistance is significantly greater.

The exact longitudinal orientation of the molecules in the direction of casting compensates for the problems to be expected when cutting materials of greater strength.

The E-modulus transversely to the direction of casting is less than the E-modulus in the direction of preparation so that the flexibility is improved even in thin layer supports (<10 μm).

No stretching processes are required in the production of the layer support; the recording material is immediately ready for casting and further processing.

We claim:

1. A process for the production of a recording material consisting of at least one recording layer cast on a flexible tape layer support having an E-modulus transverse to the direction of casting less than an E-modulus in the direction of casting comprising preparing a liquefied thermotropic polymer, extruding said liquefied thermotropic polymer through a broad sheeting die at a viscosity range of from $10^1$ to $10^2$ Pa.s at a shearing velocity of $10^1$ to $10^4$ $s^{-1}$ thereby forming a tape, cooling said extruded tape to produce a flexible tape layer support, and casting on line at least one recording layer on said flexible tape layer support.

2. The process of claim 1 wherein said extrusion of said polymer passes the polymer through the sheeting die at an extrusion speed of $V_0$, followed by passing the extruded polymer between a cooling take-off roller rotating at a traction velocity of $V_1$ and a rotating pressure roller pressing against said take-off roller, and stretching cooled extruded polymer by a ratio of $V_1/V_0$ so that the degree of stretching of the layer support is produced by a ratio of $V_1/V_0$ from 2 to 80.

3. Process according to claim 2, characterised in that the traction velocity v1 lies in a range of from 50 to 500 m/min.

4. Process according to claim 2, characterised in that the layer support has a thickness of from 3 to 500 μm.

5. Process according to claim 2, characterised in that a corona treatment is carried out on one or both sides before the recording layers are applied to the layer support.

6. The process of claim 2 wherein at least one recording layer is cast on the other side of said flexible tape layer support.

* * * * *